United States Patent
Jeon et al.

(10) Patent No.: US 11,922,302 B2
(45) Date of Patent: Mar. 5, 2024

(54) HYPER-PARAMETER OPTIMIZATION METHOD FOR SPIKING NEURAL NETWORK AND THE PROCESSING APPARATUS THEREOF

(71) Applicant: Korea Electronics Technology Institute, Seongnam-si (KR)

(72) Inventors: Seok Hoon Jeon, Seoul (KR); Byung Soo Kim, Yongin-si (KR); Hee Tak Kim, Seoul (KR); Tae Ho Hwang, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 1061 days.

(21) Appl. No.: 16/684,087

(22) Filed: Nov. 14, 2019

(65) Prior Publication Data
US 2021/0142162 A1    May 13, 2021

(30) Foreign Application Priority Data
Nov. 12, 2019  (KR) .......................... 10-2019-0144181

(51) Int. Cl.
*G06N 3/08*     (2023.01)
*G06N 3/049*    (2023.01)
(Continued)

(52) U.S. Cl.
CPC ............. *G06N 3/08* (2013.01); *G06N 3/049* (2013.01); *G06N 3/082* (2013.01); *G06N 3/084* (2013.01)

(58) Field of Classification Search
CPC .......... G06N 3/08; G06N 3/049; G06N 3/082; G06N 3/084; G06N 3/063; G06N 3/088; G06N 5/003; G06N 5/01; G06F 17/18
See application file for complete search history.

(56) References Cited

U.S. PATENT DOCUMENTS 11,216,722 B2 *  1/2022  Nurvitadhi ............. G06N 3/063
2016/0328644 A1 * 11/2016  Lin ......................... G06N 3/084
(Continued)

FOREIGN PATENT DOCUMENTS

EP    3716160 A1 *  9/2020
JP    2017-228068 A   12/2017
(Continued)

OTHER PUBLICATIONS

Keshtkaran et al., "Enabling hyperparameter optimization in sequential autoencoders for spiking neural data", Aug. 21, 2019, 33rd Conference on Neural Information Processing Systems (NeurIPS 2019), Vancouver, Canada, pp. 1-10. (Year: 2019).*
(Continued)

*Primary Examiner* — Brent Johnston Hoover
(74) *Attorney, Agent, or Firm* — Knobbe Martens Olson & Bear LLP

(57) ABSTRACT

Provided are a hyperparameter optimizer and method for optimizing hyperparameters and a spiking neural network processing unit. The optimizer includes a statistical analyzer configured to receive training data and perform statistical analysis on the training data, an objective function generator configured to generate hyperparameter-specific objective functions by using a statistical analysis value of the statistical analyzer, and an optimal hyperparameter selector configured to select optimal hyperparameters according to certain rules on the basis of the hyperparameter-specific objective functions.

10 Claims, 4 Drawing Sheets

(51) Int. Cl.
*G06N 3/082* (2023.01)
*G06N 3/084* (2023.01)

(56) References Cited

U.S. PATENT DOCUMENTS

2017/0200079 A1* 7/2017 Amir .................... G06N 3/0472
2018/0240041 A1* 8/2018 Koch ................ G06F 16/24578
2020/0394092 A1* 12/2020 Satou ....................... G06N 3/08

FOREIGN PATENT DOCUMENTS

KR 2016-0062052 A 6/2016
KR 2019-0048895 A 5/2019

OTHER PUBLICATIONS

Stamoulis et al., "Designing Adaptive Neural Networks for Energy-Constrained Image Classification", Jan. 3, 2019, 2018 IEEE/ACM International Conference on Computer-Aided Design (ICCAD), pp. 1-8. (Year: 2018).*
Office Action dated Mar. 31, 2022 in Korean Application No. 10-2019-0144181.

* cited by examiner

HYPER-PARAMETER OPTIMIZATION METHOD FOR SPIKING NEURAL NETWORK AND THE PROCESSING APPARATUS THEREOF

TECHNICAL FIELD

The present invention relates to a device and method for optimizing hyperparameters and more particularly, to an optimizer and method for optimizing various hyperparameters which cause changes in the performance of a spiking neural network (SNN) and a processing unit.

BACKGROUND ART

Hyperparameter optimization methods are mainly designed on the basis of open source frameworks and actively researched in the field of machine learning, specifically, deep learning. Due to the complexity of a system, the system is generally assumed as a blackbox, and a hyperparameter optimization algorithm or method, such as grid search, random search, or Bayesian optimization, is used. However, these algorithms are time-consuming and complex.

Meanwhile, active research is underway on a low-power and small-area processing unit for an SNN, but the performance of processing units reported in research results considerably varies or is degraded depending on the ranges of set hyperparameter values.

Currently, there is no research on a hyperparameter optimization method for an SNN or a method of optimizing hyperparameters in cooperation with hardware.

DISCLOSURE

Technical Problem

The present invention is directed to providing a method for deriving optimal values of hyperparameters.

In particular, the present invention is directed to proposing a hyperparameter selection method which is used in a spiking neural network (SNN) to obtain optimal performance according to various data applications.

The present invention is also directed to providing an optimizer for setting optimized hyperparameters and a structure for interoperation between the optimizer and a processing unit.

Technical Solution

According to an aspect of the present invention, there is provided a hyperparameter optimizer including: a statistical analyzer configured to receive training data and perform statistical analysis on the training data; an objective function generator configured to generate hyperparameter-specific objective functions by using a statistical analysis value of the statistical analyzer; and an optimal hyperparameter selector configured to select optimal hyperparameters according to certain rules on the basis of the hyperparameter-specific objective functions.

The statistical analyzer may calculate statistical information including the number of pieces of data, label-specific distribution characteristics, a minimum data value, a maximum data value, a variance, and a standard deviation regarding the training data.

The objective function generator may approximate experimental data by using a certain regression method on the objective functions each generated for hyperparameters. As an example, the objective function generator may calculate coefficient values of the hyperparameter-specific objective functions, which are coefficients of quadratic polynomial curves or sigmoid curves, by using statistical analysis results of the statistical analyzer and approximate experimental data.

The optimal hyperparameter selector may calculate calculation result accuracies of target application-specific SNNs by using two or more specific rules and select hyperparameters resulting in the highest one of the calculation result accuracies or lowest target application-specific root mean square errors (RMSEs) as optimal hyperparameters.

The two or more specific rules may be two or more of a peak value, a minimum value, a maximum value, a crossover value of two objective functions, and a backoff value of the maximum value and the minimum value.

According to another aspect of the present invention, there is provided a method of optimizing hyperparameters through statistical analysis, the method including: receiving training data; calculating a statistical value including at least one of the number of pieces of data, label-specific distribution characteristics, a minimum data value, a maximum data value, a variance, and a standard deviation regarding the training data; generating objective functions for hyperparameters used in an SNN on the basis of the calculated statistical value; performing regression on the objective functions; and selecting optimal hyperparameters according to certain selection rules.

According to another aspect of the present invention, there is provided a method of optimizing hyperparameters in cooperation with a processing unit, the method including: receiving hardware performance elements from a processing unit; and selecting optimal hyperparameters within predetermined hyperparameter-specific allowable ranges according to the hardware performance elements.

According to another aspect of the present invention, there is provided an SNN processing unit, the SNN processing unit including: an SNN accelerator configured to learn training data and make an inference on the basis of the training data; and a hyperparameter optimizer configured to select hyperparameters used for calculation processing in the SNN accelerator by considering hardware performance elements of the SNN accelerator and using a statistical analysis method and transfer the selected hyperparameters to the SNN accelerator.

Advantageous Effects

According to exemplary embodiments of the present invention, it is possible to select optimal hyperparameters which are more appropriate than those selected by an existing experimental hyperparameter selection method. In particular, an SNN can have optimal performance according to various data applications at all times.

In this way, it is possible to reduce a learning time of an SNN. In other words, while an existing deep learning network configured with a complex algorithm requires a large amount of energy for learning, an SNN according to an exemplary embodiment of the present invention can perform learning with low power through spike event-based calculation and can perform on-chip learning.

As a result, a processing unit capable of setting optimized hyperparameters is provided, thereby making it possible to perform learning and make an inference in one chip. Also, compared to a related SNN technology, the processing unit makes high performance and low power operation possible.

Also, it is possible to solve a problem that the performance of a processing unit considerably varies or is degraded depending on the ranges of set hyperparameter values.

The scope of the present invention should be defined by the following claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
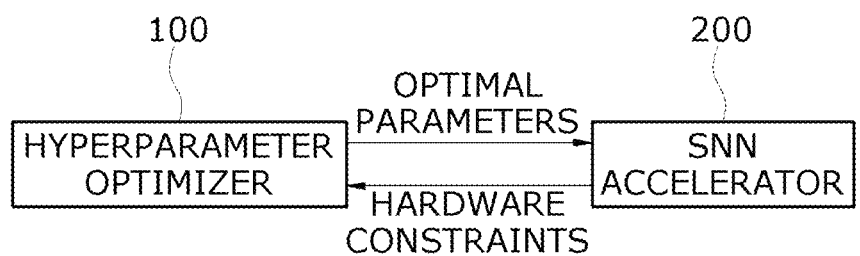
FIG. 1 is a diagram showing a mutual operation between a hyperparameter optimizer and a spiking neural network (SNN) processing unit (SNN accelerator) according to an exemplary embodiment of the present invention.

Objects and effects of the present invention are not limited to those mentioned above, and the objects and effects the present invention and methods for achieving them will be made clear from embodiments described in detail below with reference to the accompanying drawings.

In describing the present invention, when it is determined that the detailed description of a well-known function or element may obscure the gist of the present invention, the detailed description will be omitted. Also, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains.

Throughout the specification, when a part is referred to as "including" or "having" an element, it does not preclude another element and may further include the other element unless the context clearly indicates otherwise. Also, as used herein, the term "unit," "apparatus," "device," "section," "module," or the like refers to a unit for processing function or operation, which may be implemented by hardware or software or a combination of hardware and software.

Meanwhile, in each embodiment of the present invention, each element, functional block or means may be composed of one or more sub-elements. Electrical, electronic, and mechanical functions performed by each element may be implemented by various known devices or mechanical elements, such as an electronic circuit, an integrated circuit, and an application specific integrated circuit (ASIC), and may be implemented separately, or two or more thereof may be integrated into one.

Hereinafter, a configuration of the present invention will be described in detail with reference to the accompanying drawings.

A first fundamental technical spirit of the present invention is to analyze performance and features of processing units (artificial intelligence (AI) accelerators) which vary as hyperparameters are set and to set hyperparameters within fixed or limited ranges, thereby achieving higher algorithm performance and making it possible to design more efficient hardware than existing processing units with limited performance.

A second fundamental technical spirit of the present invention is to conduct a statistical analysis on training data, to perform regression on objective functions of hyperparameter values on the basis of statistical values, and also to derive application-specific optimal hyperparameters appropriate for applications by using specific rules, such as a peak value, a minimum value, and a crossover value of objective functions, regarding the data.

To help understanding the present invention, a spiking neural network (SNN) is briefly described first, and hyperparameters to be optimized in the present invention are described.

A calculation method such as deep learning which performs calculation by using a neural network having many hidden layers requires a large amount of training data and high-performance computing resources and thus is difficult to use in a low-power and low-performance small device (e.g., an Internet of things (IoT) terminal) applied to various situations in practice. Consequently, neuromorphic research is actively underway.

The SNN technology which is major one of the research fields performs learning and makes an inference by simulating behavior of human brain. In one neuromorphic chip, it is possible to perform learning and make an inference, and a processing unit implementing the neuromorphic chip is referred to as an SNN accelerator.

The basic configuration and operation of an SNN processing unit are as follows. An SNN processing unit includes a plurality of neurons and synapses connecting the neurons to each other. One neuron is allocated to each piece of data and designed to generate a spike signal according to the intensity of a signal. The sum of values of synapses to which a spike signal is transferred is compared with a preset threshold value to output the spike signal. At an output end, the output spike signal is grouped and classified, and an output value is obtained by clustering output spike signals. In this way, it is possible to obtain deep learning effects of multiple hidden layers.

In such an SNN processing unit, the following hyperparameters are used.

Main Parameters

Length of a spike train: This is the length of a spike train for representing one piece of data. Since the amount of calculation linearly increases according to the length, hardware energy consumption may increase, and calculation time may increase.

Number of neurons: When the number of postsynaptic neurons is small, learning is not completely performed, and performance is degraded. When the number of postsynaptic neurons is too large, calculation complexity increases, and both calculation time and power consumption increase.

Generation frequency of input spikes: The higher the generation frequency of input spikes, the greater the amount of calculation and power consumption.

Synapse weight learning rate: This is a variable regarding the variation of a weight used in synapse learning. When the value is greater than an optimal value, learning is rapidly performed, but the performance may be degraded due to overfitting. When the value is smaller than the optimal value, learning may slow down or may be hardly achieved.

Threshold learning rate: This is a variable regarding the variation of a threshold value used when each neuron generates a spike. When the value is too large, the amount of calculation may increase, and when the value is too small, learning time may increase.

Initial threshold value: This is an initial threshold value that each neuron has. When the value is too small, a spike generation frequency increases, and the amount of calculation and hardware energy consumption increase.

Membrane time constant: This is a variable influencing when learning performance is measured. When the value is not an optimal value, performance may be degraded.

Other Parameters

Number of times of learning: This is the number of times of learning required for training synapses. When the number of times of learning is a specific value or more, performance is saturated, and thus energy consumption and calculation time unnecessarily increase in terms of hardware.

Spike-timing-dependent plasticity (STDP) boundary: When a postsynaptic neuron fires a spike, a synaptic weight is potentiated or depressed through spike time information generated by a presynaptic neuron. An STDP boundary is the spike time boundary between the potentiation and depression.

A configuration of the present invention related to the first fundamental spirit of the present invention will be described below with reference to FIG. 1.

As shown in the drawing, a hyperparameter optimizer 100 receives hardware performance elements, that is, hardware constraints (power, chip area, etc.), from an SNN processing unit (hereinafter, referred to as "SNN accelerator") 200.

The optimizer 100 sets optimal hyperparameters by considering the received hardware performance elements.

For example, the main hyperparameters, such as the length of a spike train, the number of neurons, and the generation frequency of input spikes, are directly affected by the power consumption and chip area of the SNN accelerator 200. When the number of neurons, the length of a spike train, and the generation frequency of input spikes are set to too large values without considering the SNN accelerator power and chip area, accelerator performance may be degraded.

Therefore, the hyperparameter optimizer 100 according to an exemplary embodiment of the present invention derives optimal parameters by considering the hardware performance elements of the SNN accelerator 200 which will operate on the basis of the parameters.

The optimizer 100 takes hardware performance elements into consideration as shown in the following table according to an exemplary embodiment of the present invention.

TABLE 1

| Variable name | Data type | Range (hardware is taken into consideration) |
|---|---|---|
| Spike train length | Int | $0 < x < 800$ |
| Number of neurons | Int | $0 < x \leq 1{,}600$ |
| Generation frequency of input spikes | Float | $0 < x \leq 1$ (assuming $0 \leq \text{rand}() \leq 1$ and $0 \leq \text{input pixel} \leq 1$) |
| Synaptic weight learning rate | Float | $0 < x < 1$ |
| Threshold learning rate | Float | $0 < x < 1$ |
| Initial threshold | Float | $0 < x <$ maximum of neuron-specific synaptic sums |
| Membrane time constant | Float | $0 < x < \infty$ |

Table 1 is an example of a table in which hyperparameter-specific allowable ranges are defined for hardware having a specific area and power consumption.

In other words, a table of hyperparameter-specific allowable ranges which are allowed, that is, ensure appropriate performance, according to hardware performance elements is determined in advance and prepared as shown above, and hyperparameters are selected within ranges allowed by input hardware performance elements.

Optimal parameters derived in this way are transferred to the SNN accelerator 200 so that optimal performance may be achieved by processing calculation on the basis of the SNN.

Figure 2:
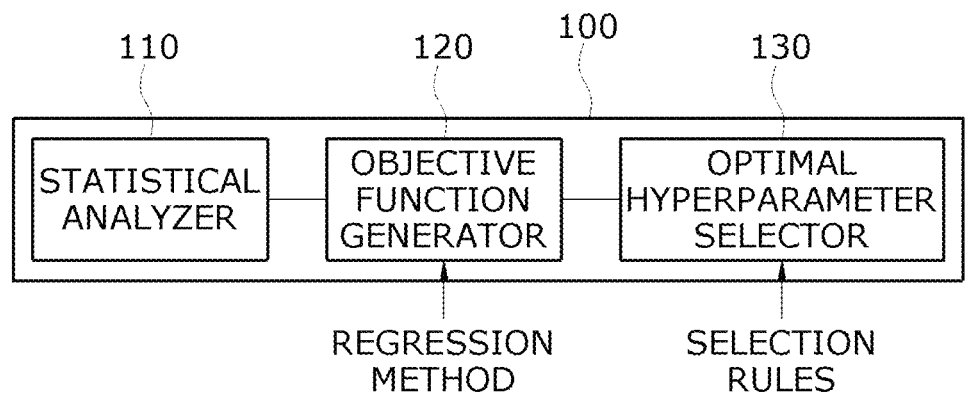
FIG. 2 is a block diagram showing an internal configuration of the hyperparameter optimizer according to an exemplary embodiment of the present invention.

An internal configuration and operation of the hyperparameter optimizer 100 according to the second technical spirit of the present invention will be described below with reference to FIG. 2.

As shown in the drawing, the optimizer 100 according to an exemplary embodiment of the present invention is an optimization device which generates hyperparameters required for an SNN by using training data as an input and includes a statistical analyzer 110 which performs statistical analysis on data, an objective function generator 120 which generates hyperparameter-specific objective functions by using statistical analysis values, and an optimal hyperparameter selector 130.

The statistical analyzer 110 calculates various pieces of statistical information including the number of pieces of data, label-specific distribution characteristics, a minimum data value, a maximum data value, a variance, and a standard deviation.

The objective function generator 120 supports various regression methods for objective functions of hyperparameter values used in an SNN by using statistical values of training data calculated by the statistical analyzer 110.

For example, in curve regression, coefficient values of objective functions, which are coefficients of quadratic polynomial curves or sigmoid curves, are calculated according to hyperparameters by using statistical analysis results, and experimental data is approximated.

Finally, the optimal hyperparameter selector 130 selects and outputs hyperparameters which optimize accuracy of an appropriate SNN for a target application, a root mean square error (RMSE) of the SNN, or the like by using specific rules, such as a peak value, a minimum value, and a crossover value of objective functions, and uses the selected hyperparameters as an input to the SNN system.

Optimal values are selected according to the selection rules by using hyperparameter-specific objective functions generated and transferred by the objective function generator 120. The selection rules may be the maximum value or minimum value of an objective function, a backoff value of the maximum value and the minimum value, or a crossover value of two objective functions. In addition, when two hyperparameters are simultaneously optimized, a minimum or maximum value of the line of intersection for planes may be selected.

Figure 3:
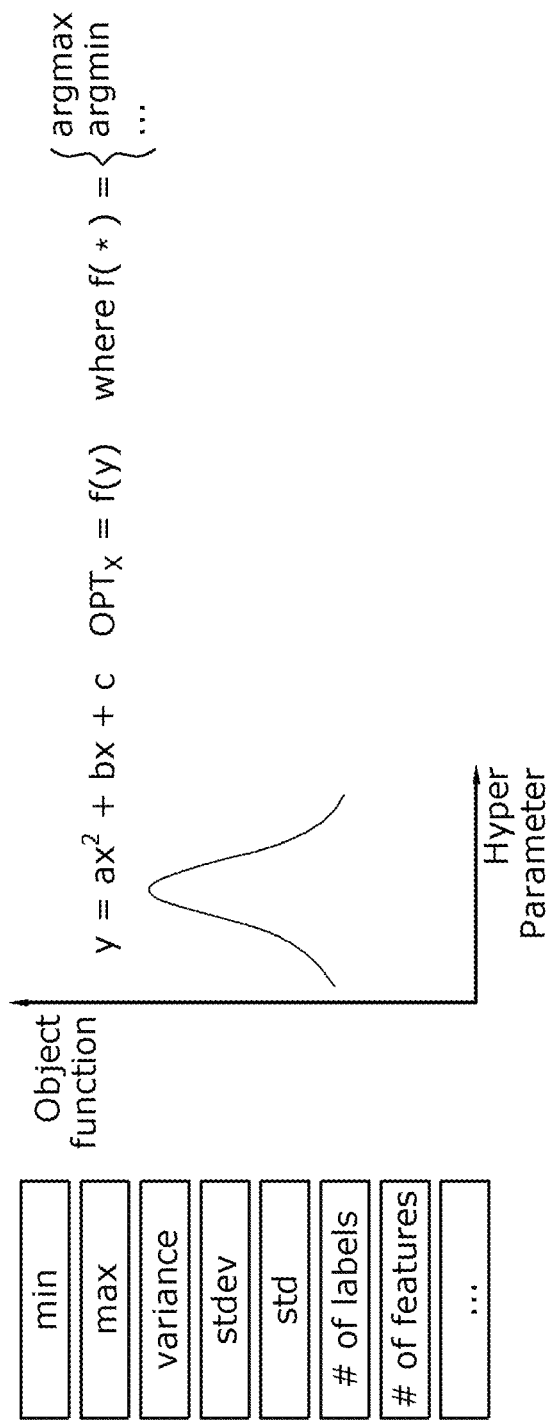
FIG. 3 is a conceptual diagram showing an internal processing process of the hyperparameter optimizer according to an exemplary embodiment of the present invention.

Operation of the optimizer 100 is conceptually illustrated in FIG. 3.

The hyperparameter optimizer 100 having the above configuration according to an exemplary embodiment of the present invention may determine a regression method and a selection method according to an application to be executed and thereby derive application-specific optimal parameters.

Also, as described above, optimal parameters may be selected within parameter-specific allowable ranges like in Table 1 by considering hardware specifications of an SNN accelerator so that optimal hyperparameters may be derived according to SNN accelerators.

Figure 4:
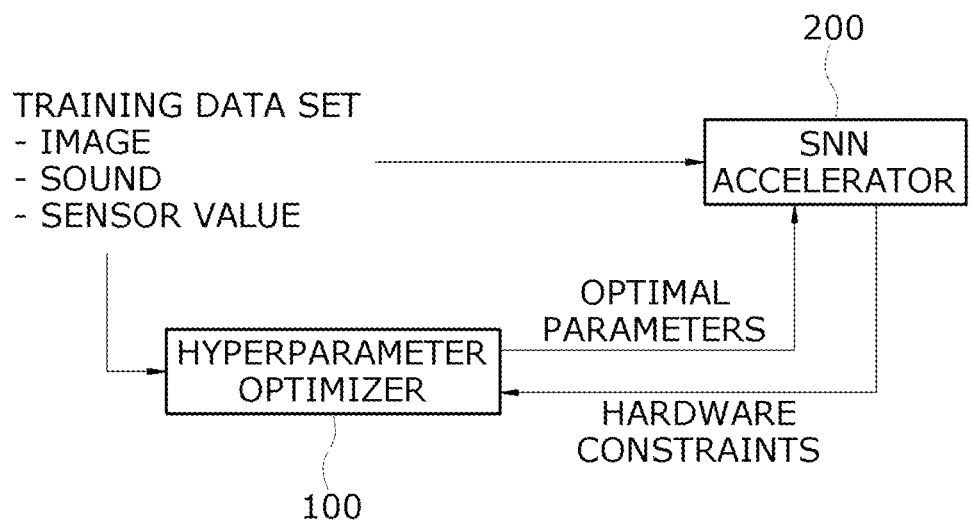
FIG. 4 is a data flowchart between the hyperparameter optimizer and the SNN processing unit (SNN accelerator) which interoperate with each other according to an exemplary embodiment of the present invention.

FIG. 4 is a data flowchart illustrating a method in which the hyperparameter optimizer 100 and the SNN processing unit (SNN accelerator) 200 according to an exemplary embodiment of the present invention interoperate with each other.

The SNN accelerator 200 according to an exemplary embodiment of the present invention executes an SNN on the basis of application-specific optimal hyperparameters received from the optimizer 100. The SNN accelerator 200 basically performs calculation on the basis of a spike and is designed to operate various neural network structures. Also, the SNN accelerator 200 includes calculation for learning therein.

In particular, according to the first technical spirit of the present invention, the hyperparameter optimizer 100 may receive comprehensive hardware performance elements, such as power consumption and chip area, from the SNN accelerator 200 and determine optimized hyperparameters by considering the hardware performance elements.

The above-described first and second technical spirits may be applied together or separately to the optimizer 100 and the SNN accelerator 200 according to an exemplary embodiment of the present invention.

Figure 5:
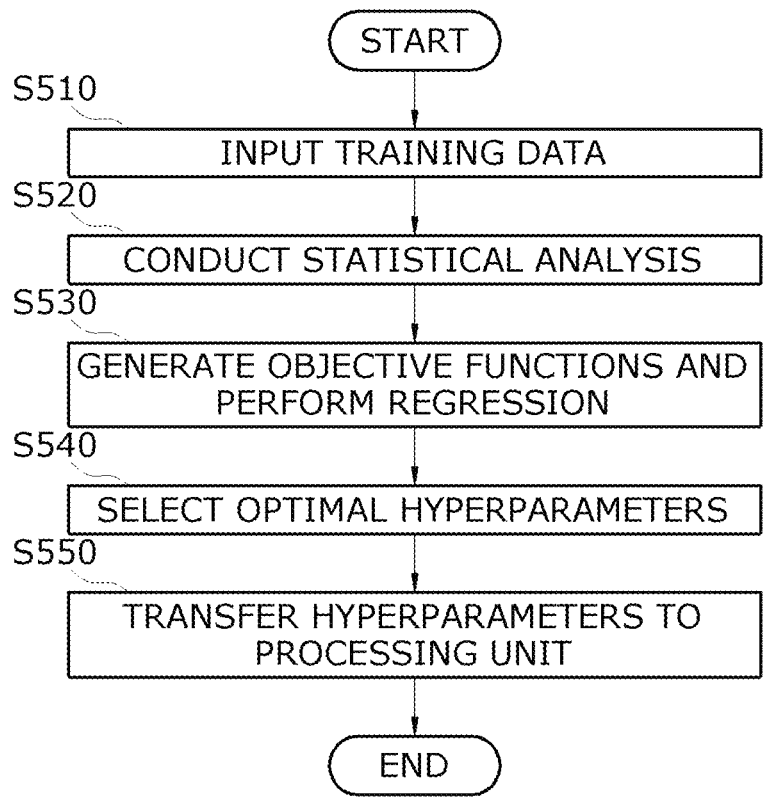
FIG. 5 is a flowchart illustrating a method of optimizing hyperparameters according to an exemplary embodiment of the present invention.

An optimization method according to an exemplary embodiment of the present invention will be described below with reference to FIGS. 5 and 6.

In an optimization method according to an exemplary embodiment of the present invention, first, training data is input (S510), and various pieces of statistical information including the number of pieces of data, label-specific distribution characteristics, a minimum data value, a maximum data value, a variance, and a standard deviation are calculated (S520).

Subsequently, objective functions of hyperparameter values used in an SNN are generated on the basis of the calculated statistical information of the training data, and various regression methods are applied to the objective functions (S530).

Hyperparameters which optimize accuracy, an RMSE, or the like of an appropriate SNN for each application are selected on the basis of the objective functions and output (S540).

Optimal values are selected according to selection rules hyperparameter-specific objective functions. The selection rules may be the maximum value or minimum value of an objective function, a backoff value of the maximum value and the minimum value, or a crossover value of two objective functions. In addition, when two hyperparameters are simultaneously optimized, a minimum or maximum value of the line of intersection for planes may be selected.

The selected optimal hyperparameters are transferred to be used as an input of an SNN accelerator (S550).

Figure 6:
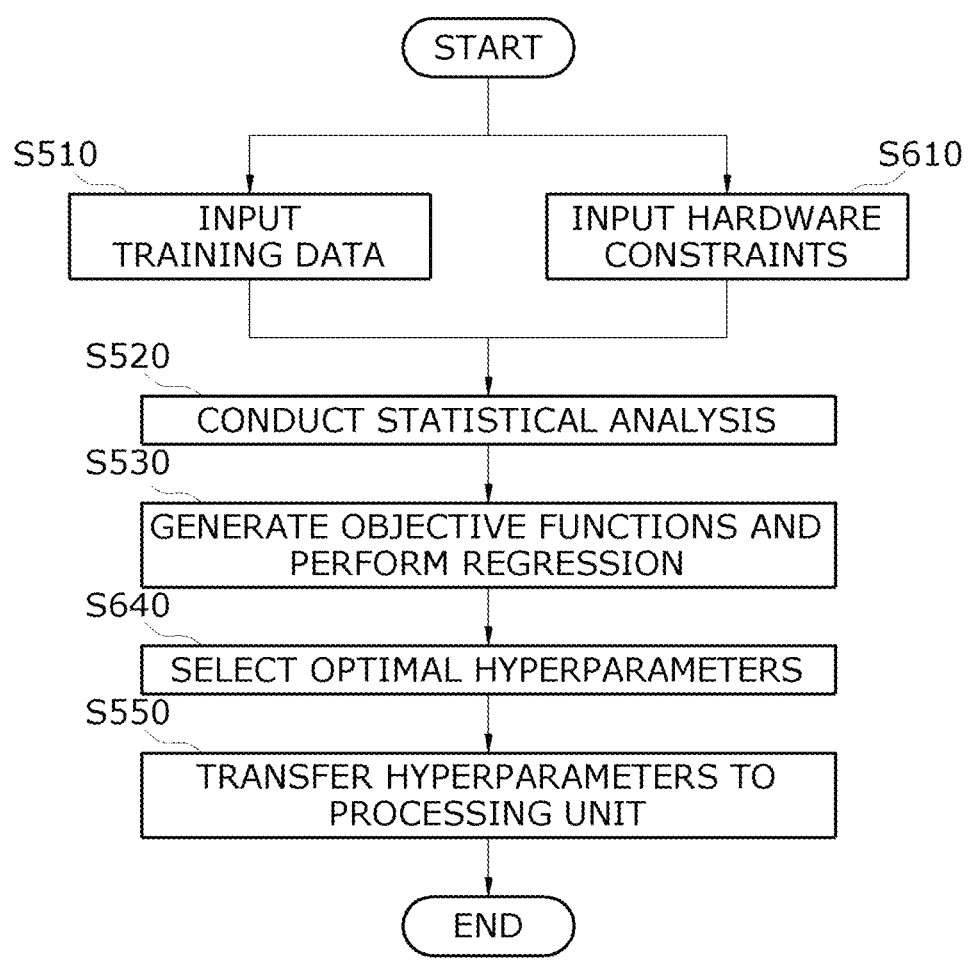
FIG. 6 is a flowchart illustrating a method of optimizing hyperparameters according to another exemplary embodiment of the present invention.

Meanwhile, according to another exemplary embodiment illustrated in FIG. 6, hardware constraints of an SNN accelerator may be additionally taken into consideration in selecting optimal hyperparameters.

In other words, constraints related to hardware performance elements, such as power consumption and chip area, of the SNN accelerator are input (S610), and the constraints are taken into consideration in selecting optimal hyperparameters (S640).

For example, the other exemplary embodiment may further include a process of preparing two or more hyperparameter-specific allowable range tables according to hardware performance elements within designable ranges, consulting an allowable range table suitable for the input hardware performance elements, and selecting hyperparameters within hyperparameter-specific allowable ranges defined in the consulted allowable range table.

In other words, hyperparameters may be selected by performing the above-described method (S510 to S550) within allowable ranges in which hardware is taken into consideration. Alternatively, hyperparameters are selected by the above-described method, it is determined whether the selected hyperparameters are within allowable ranges in which hardware is taken into consideration, and the hyperparameter selection process is performed again by the above-described method when the selected hyperparameters are not within the allowable ranges.

The present invention has been described in detail above with reference to exemplary embodiments. However, the exemplary embodiments are only examples for facilitating understanding of the present invention, and the scope of the present invention is not limited to elements of each embodiment. Various modifications and alterations can be made from the above-described embodiments within the technical spirit of the present invention.

For example, a hyperparameter optimizer and an SNN accelerator of the present invention may be connected together and implemented in one chip or may be separately implemented as different devices. In other words, a processing unit of the present invention may be an SNN accelerator alone or include an SNN accelerator and an optimizer.

Also, the technical spirit of the present invention is not limited to an SNN and can be applied to accelerators and processing units in all fields which require parameter optimization.

What is claimed is:

1. A spiking neural network (SNN) system comprising a SNN accelerator and a computer-implemented hyperparameter optimizer for optimizing hyperparameters of the SNN accelerator, the hyperparameters comprising two or more of a length of spike train, an amount of neurons in a spiking neural network, a generation frequency of input spikes, a synapse weight learning rate, a threshold learning rate, an initial threshold value, or a membrane time constant,
  wherein the SNN accelerator comprises an neuromorphic chip configured to perform learning and make an inference,
  wherein the hyperparameter optimizer is connected to the SNN accelerator and comprises:
    a processor configured to:
      receive hardware performance elements from the SNN accelerator connected to the hyperparameter optimizer, the hardware performance elements being indicative of hardware constraints of the SNN accelerator;

define hyperparameter-specific allowable ranges for the hyperparameters based on the hardware performance elements;

receive training data comprising a plurality of pieces of data;

process the training data and compute a statistical value including at least one of an amount of the pieces of data, label-specific distribution characteristics, a minimum data value, a maximum data value, a variance, or a standard deviation regarding the training data;

generate hyperparameter-specific objective functions based on the computed statistical value;

perform regression on the hyperparameter-specific objective functions;

select hyperparameters using the hyperparameter-specific objective functions according to certain selection rules and further based on the hyperparameter-specific allowable ranges; and transfer the selected hyperparameters to the SNN accelerator, and wherein the neuromorphic chip is configured to perform on-chip learning using the selected hyperparameters.

2. The SNN system of claim 1, wherein the processor is further configured to approximate experimental data by using a certain regression method on the hyperparameter-specific objective functions each generated for hyperparameters.

3. The SNN system of claim 1, wherein the processor is further configured to calculate coefficient values of the hyperparameter-specific objective functions, which are coefficients of quadratic polynomial curves or sigmoid curves, by using the computed statistical value.

4. The SNN system of claim 1, wherein the processor is further configured to compute calculation result accuracies of target application-specific spiking neural networks in the SNN accelerator by using two or more specific rules as the certain selection rules and select the hyperparameters resulting in highest one of the calculation result accuracies as the hyperparameters.

5. The SNN system of claim 1, wherein the processor is further configured to select the hyperparameters which are derived by using two or more specific rules and result in a lowest target application-specific root mean square error (RMSE) as the hyperparameters.

6. The SNN system of claim 4, wherein the two or more specific rules are two or more of a peak value, a minimum value, a maximum value, a crossover value of two objective functions, or a backoff value of the maximum value and the minimum value.

7. A computer-implemented method of optimizing hyperparameters through statistical analysis in a spiking neural network (SNN) system comprising an SNN accelerator and a hyperparameter optimizer connected to the SNN accelerator, the SNN accelerator comprising an neuromorphic chip and configured to perform learning and make an inference, the hyperparameters comprising two or more of a length of spike train, an amount of neurons in a spiking neural network, a generation frequency of input spikes, a synapse weight learning rate, a threshold learning rate, an initial threshold value, or a membrane time constant, the method comprising:

receiving hardware performance elements from the SNN accelerator connected to the hyperparameter optimizer, the hardware performance elements being indicative of hardware constraints of the SNN accelerator;

defining hyperparameter-specific allowable ranges for the hyperparameters based on the hardware performance elements;

receiving training data comprising pieces of data;

processing the training data and computing a statistical value including at least one of an amount of the pieces of data, label-specific distribution characteristics, a minimum data value, a maximum data value, a variance, or a standard deviation regarding the training data;

generating hyperparameter-specific objective functions for the hyperparameters based on the computed statistical value;

performing regression on the hyperparameter-specific objective functions;

selecting hyperparameters using the hyperparameter-specific objective functions according to certain selection rules and further based on the hyperparameter-specific allowable ranges; and transferring the selected hyperparameters to the SNN accelerator so that the neuromorphic chip is configured to perform on-chip learning using the selected hyperparameters.

8. The method of claim 7, wherein performing the regression comprises computing coefficient values of the hyperparameter-specific objective functions, which are coefficients of quadratic polynomial curves or sigmoid curves, by using the statistical value and approximating experimental data.

9. The method of claim 7, wherein selecting the hyperparameters comprises selecting hyperparameters, which result in highest accuracy of a spiking neural network in the SNN accelerator appropriate for each application or a minimum root mean square error (RMSE) as a result of the regression, as hyperparameters.

10. The method of claim 7, wherein receiving the hardware performance elements comprises receiving at least one of power consumption or chip area of a spiking neural network accelerator.

* * * * *